(12) United States Patent
Sarin

(10) Patent No.: US 10,657,552 B2
(45) Date of Patent: May 19, 2020

(54) TAP PROXIMITY

(71) Applicant: PayPal, Inc., San Jose, CA (US)

(72) Inventor: Pankaj Sarin, Chennai (IN)

(73) Assignee: PayPal, Inc., San Jose, CA (US)

( * ) Notice: Subject to any disclaimer, the term of this patent is extended or adjusted under 35 U.S.C. 154(b) by 545 days.

(21) Appl. No.: 15/045,705

(22) Filed: Feb. 17, 2016

(65) Prior Publication Data

US 2017/0236142 A1 Aug. 17, 2017

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0224* (2013.01); *G06Q 30/0283* (2013.01); *G06Q 30/0643* (2013.01)

(58) Field of Classification Search
None
See application file for complete search history.

(56) References Cited

U.S. PATENT DOCUMENTS

| 2012/0095848 | A1* | 4/2012 | Chan | G06Q 30/02 705/14.73 |
| 2012/0235892 | A1* | 9/2012 | Narendra | G06F 3/017 345/156 |
| 2013/0138507 | A1* | 5/2013 | Kumar | G06O 30/0251 705/14.54 |
| 2017/0206543 | A1* | 7/2017 | Teichner | G06Q 30/0251 |
| 2017/0229148 | A1* | 8/2017 | Gilley | G11B 27/034 |
| 2018/0068184 | A1* | 3/2018 | Dubuque | G06K 9/00671 |
| 2018/0146045 | A1* | 5/2018 | Kang | H04Q 9/00 |
| 2018/0188919 | A1* | 7/2018 | Yuan | G06F 3/0416 |

* cited by examiner

*Primary Examiner* — Alvin L Brown
(74) *Attorney, Agent, or Firm* — Haynes and Boone LLP

(57) ABSTRACT

A system that identifies whether an object is within close proximity to a touch screen of a user device using one or more sensors. The system may optimize incentives based on what is being displayed on the user device when the system identifies the object.

20 Claims, 7 Drawing Sheets

300

301
Receive Sensor Information

302
Receive Device Information

303
Determine a Product or Service Being Browsed

304
Determine that an Object is Close to the Screen

305
Determine an Incentive

306
Provide Incentive for Product/Service

400

401
Receive User Device Sensor Information

402
Receive Tap Indication

403
Record Sensor Information in Training Database

404
Receive Sensor Information

405
Use Training Database to Classify the Sensor Information

406
Use Classification To Predict Object Within Proximity

500

501 Receive Input Data

502 Determine Incentive

503 Provide Incentive

504 Receive result

505 Update Neural Network

TAP PROXIMITY

TECHNICAL FIELD

The present disclosure generally relates to detecting objects within certain proximity of a touchscreen and using the detection data as part of an incentive determination.

BACKGROUND

With traditional shopping at a merchant store, a shopper's interest in various items can be determined by a store employee seeing what the shopping is looking at, trying on, or asking about. However, with the Internet and online shopping, this type of valuable information can be hard to obtain. For example, online users typically tap or otherwise select content on a display screen to indicate interest, which can direct the user to additional information or start a purchasing flow. It is difficult to determine whether the user is or was interested in an item not selected. One or more of the embodiments disclosed below help address this difficulty along with providing other advantages.

Figure 1:
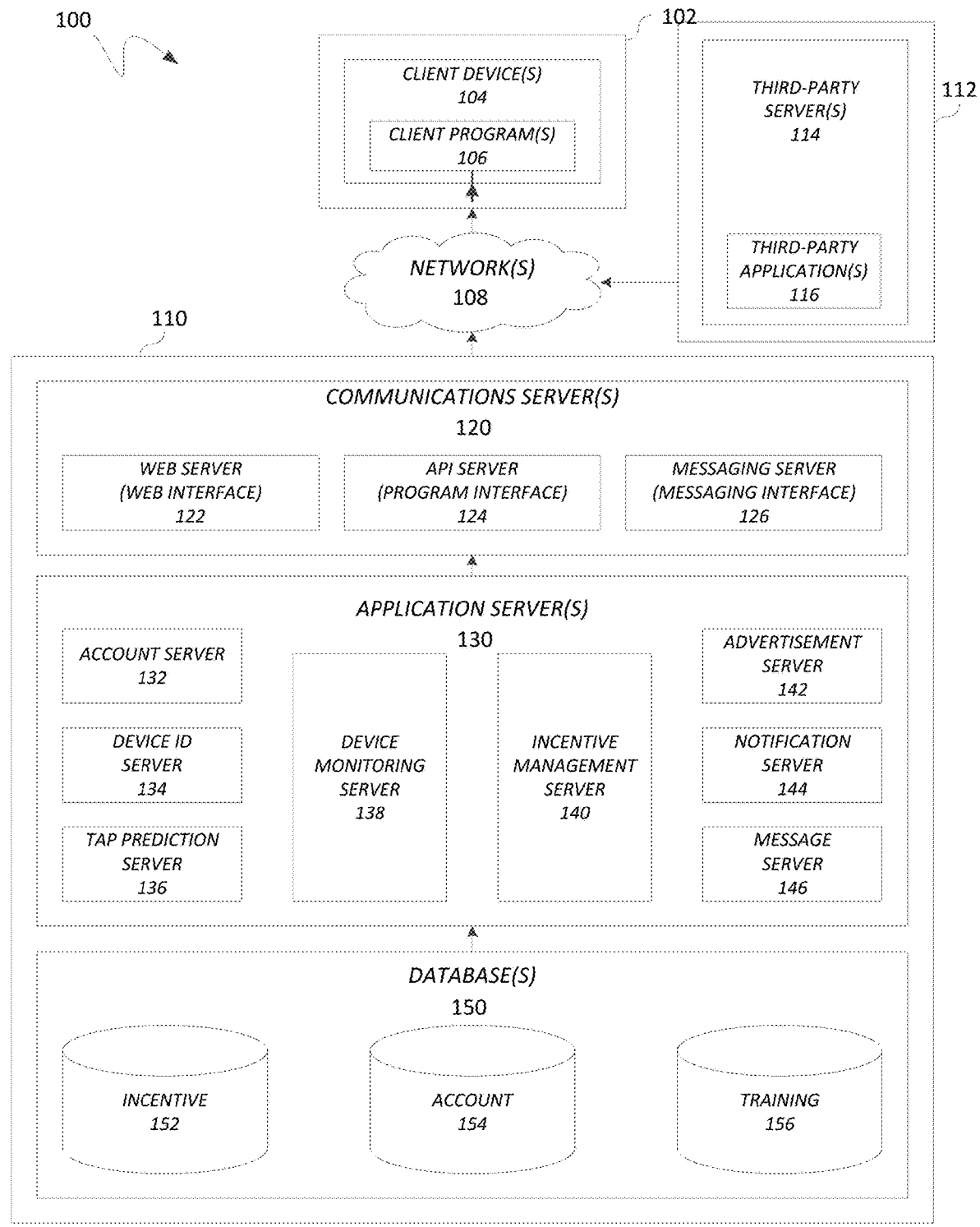
FIG. 1 is a block diagram of an exemplary computing system that is adapted for implementing a system for identifying non-touch based user interactions with a touchscreen device and implementing consumer predictions based on the identifications.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As technology has progressed and the internet has become more and more prevalent, companies have been able to record large amounts consumer data. However, developments for obtaining data related to touchscreen interactions have been lacking. For example, determining whether a user came close to tapping and/or actuating a touchscreen is valuable information. This type of information could be used to customize a user experience and better market products and/or services. However, current systems do not allow for obtaining this information. This is likely due to several technological hurdles that must be overcome to obtain such information. One of the major hurdles is simply detecting whether an individual is about to actuate a touchscreen. There is no simple data sensor to identify this situation. Unlike a cursor, which a system can accurately pin point through interactions with a user device, touchscreens do not have a simple mechanism for determining user actions where the touchscreen is not being contacted.

It would be beneficial if a system could determine whether an object, such as a user finger, is in proximity with a touchscreen device. Such a system would provide access to this consumer data for analysis.

Furthermore, it would be beneficial if there was a system that could use the detected information to directly affect the user experience individually. Current systems often aggregate data from many users and provide the data to merchants and/or service providers for analysis. Afterwards, it is up to the merchant to use the consumer intelligence to make changes either to pricing, consumer interfaces, advertisement targeting and/or the like. This is generally a change that all users see and is not very individualized. Often, this is the result of the data analytics system not being able to directly interface with either the user device and/or the merchant system. A system that would be able to interface and exchange relevant data between merchant devices and user devices to create an individualized experience is complicated and requires a fairly intricate system. Such a system would need to have conforming data types, data identifiers, and specifics application interfaces.

However, a system that would be capable of orchestrating and interacting with merchant systems would be beneficial. Such a system would allow for merchant and advertisement systems to create an individualized experience for a consumer based on consumer data.

Additionally, it would be desirable if the user experience could be adjusted based on the tap proximity determination data for the user. For example, a system that could predict how to customize user experiences such that that it resulted in an amicable agreement between the merchant and consumer would be useful.

It would also be beneficial if a system could provide better targeted advertisements. Current systems basically use website browsing information to determine which advertisements to provide. However, such methods are poor at determining whether the advertisements are currently effective and/or whether the individual was actually interested in the advertised product. Furthermore, users generally browse many different websites and objects on a daily basis. Because there is a limit on the number of advertisements that can be displayed at one time, systems have to decide what to advertise. It would be beneficial if a system could determine which advertisements are likely to be more successful or are currently successful. Additionally, it would be beneficial if the advertisements could adjust or change in real time based on indications that the user is interested in the product.

Furthermore, it would be desirable if the system could regularly adjust based on verifiable predictions about a individual. The difficulty, often times, in making a prediction on a consumer preference based on consumer data is that the prediction is not verifiable. For example, consumer data, such as consumer purchasing data, may indicate that a product with a specific feature is more desirable than without it. The consumer data may show that a product that is the color red has sold more easily than the product in another color. At this point, the merchant can use this information to predict that the product with the color red could be sold for a higher price. However, this prediction is not verifiable until the price is actually raised and consumers either buy or do not buy the product at the new price. This presents a large risk to the merchant. Furthermore, the merchant must make a prediction on how much the price should be raised based on the consumer data. Pricing the sale of a service and or product requires a careful balance between sale volume and margins. A price too high may increase margins but overly reduce sales, and thus reducing profitability. On the other hand reducing the price too much may increase sales but at too low of a margin, and therefore also reducing profitability. Determining how price changes are affecting profitability and sales is a slow process and a lot of money can be lost when experimenting with different prices. Instead, it would be better if a system could iteratively make predictions based on feedback and continuously optimize its predictions in a quick adaptive manner.

One or more of the embodiments disclosed below addresses the desirable features discussed above in addition to other desirable features.

Merchants, service providers, and advertisers are all interested in determining whether an individual is interest in a good and/or service. Merchants and service provides are particularly interested in determining why users purchase or do not purchase goods or service, the type of consumers that buy or do not buy a product or service, and how interested a user is in a product or service.

For example, merchants and service providers would be interested in knowing whether a decision to purchase goods or services was instant or took a bit of thought. This information may be used to determine how interested a person was in the good or service. In some examples, a merchant and or service provider may be able to use such information to help increase the odds of a sale.

In a similar manner, such information could help advertisers. Advertisers may be able to determine demographics and/or users that advertisements for a product or service work best on. In this manner, advertisers may be able to target advertisements to increase the chances of the advertisement leading to a purchase. Some advertisers may get paid by the number of unique users who click on an advertisement, and because there is a limit on the number of advertisements a user can see, it would be advantageous to customize advertisements that the user would be most interested in.

In some examples, a system and method for determining user interest is provided. In some embodiments, the interest is determined based on the proximity of a tapping device, such as a finger, stylus, and/or the like, to specific content on a display. In some embodiments, the user interest may be determined based on movement and/or the location of a virtual pointer, such as a mouse pointer/arrow. In some examples a system may determine when a user almost tapped and/or actually tapped on an advertisement, product, and/or a specific image on the touchscreen. In some examples the system may monitor tap data, such as how long a tapping device hovered over the touchscreen before tapping, and whether one or more stimuli that may have contributed to causing the tap or not. In some examples, the system may monitor the location of a mouse and click data of the mouse rather than tap data.

In some examples, the system may monitor one or more sensors, such as a front facing camera, heat sensor, pressure sensor, and/or the like to monitor touch based activity on a user device. In some examples, whenever a tap on the user device is received, the system may record sensor data from the user device just before the tap occurred for machine learning purposes. The system may use the recorded data to determine or predict when a user is about to tap on the touchscreen. In some examples, the system may monitor sensor data and compare the received sensor data with the recorded sensor data to determine whether a user almost tapped on or came in close proximity to a touchscreen.

In some examples, the system may monitor whether a user almost tapped a screen for a purchase checkout, advertisement, and/or the like. This data may be provided to the product, service, and/or advertisement provider for implementing one or more actions. For example, a product, service, and/or advertisement provider may request that the system provide an incentive, start a chat window, and/or provide a number to call to a user in response to receiving the almost tap indication.

In some examples, the product, service, and/or advertisement provider may be able to target the actions to a certain demographic. For example, the actions may be targeted to users who are located in a certain area, such as a city, state, country, and/or the like. The location may be determined from a global positioning system, user information, and/or the like. In some examples, the targeting may be dependent on time of day.

In some examples, the system may also monitor facial expressions for when a user almost tapped a screen. The system may use a front facing camera to take images of the face of a user. The system may analyze the facial image for certain expressions or emotions. The system may determine a pattern of facial expressions that are associated with an almost tap, and in response, display target advertisements for a product and/or service for when the user has a different facial expression.

In some examples, the system may monitor facial expressions for a particular product but with different features and or attributes, such as the color of the product. The system may attempt to determine a pattern of facial expressions for when a purchase for a product with a certain color occurs and target advertisements for the product with the certain color based on the facial expression of the user.

In some examples, the system may identify when a user is about to tap a screen for a product and/or advertisement, and in response, contact a product provider and/or advertisement provider to review the user and decide whether an incentive should be provided. For example, when a user is hovering their finger over a purchase button, the system may alert a merchant that a user is about to purchase a product but their actions indicate that the user is hesitant. The system may provide information about the user such that the provider can determine the best incentive for overcoming the hesitation. This information may indicate how long the user has been viewing the product, how many times the user has viewed the product, whether there are any products associated with the product being viewed, the price of the product, and/or the like. For example, a user may be displaying hesitancy in purchasing a camera, and the user has been viewing the product for longer than five minutes. The system may provide this information to the merchant and provide some optional incentives to get the user to purchase the camera, such as giving a free camera bag, camera lens, camera strap, or a money discount to the purchaser.

To maintain the highest possible sales margin, it is in the interest of the merchant to provide an incentive that is just enough to get the user to purchase a product. In this manner, the merchant may be able to maximize their profits. In some examples, the system may suggest or implement incentives based on the user information. The system may then determine whether the incentive was successful or not and adjust future incentives accordingly.

However, determining the threshold incentive can be difficult for a computer. Humans, on the other hand, may be better at making predictive and intuitive estimates when enough information is provided. As such the system may to provide the user information to the merchant. In some examples, the information may be provided in a format that is easily ingestible, such as trends associated with the user information. In this manner, a human associated with the merchant may be able to make a judgment on how big of a discount should be provided to the user. Such information may include identifying users who are displaying hesitancy, information about the user (e.g. purchasing habits, prior purchases from the merchant, how long the finger of the user is hovering over a purchase button, and/or the like), information about past incentives that were successful and/or unsuccessful in pushing other users to purchase a product, and/or the like.

The system may provide an intuitive graphical user interface to the merchant such that the merchant can quickly and easily provide an incentive to the user as the user is browsing a product. Furthermore, the system may discretely provide the incentive to the user such that the user may believe that the discount was serendipitous. For example, the system may email or text the user with a coupon while the user is browsing the product. The coupon may be a general percentage discount with no indication of the product the user is browsing. In this manner the user may believe this discount just happened to come along at the same time as the user was browsing the product, and use the discount to purchase the product the user was hesitant about.

FIG. 1 illustrates, in block diagram format, an exemplary embodiment of a computing system adapted for implementing a system for identifying non-touch based user interactions with a touch screen device and implementing consumer predictions based on the identification. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting third-party applications 116. In various implementations, third-party servers 114 and/or third-party applications 116 may host applications associated with or employed by a third party 112. For example, third-party servers 114 and/or third-party applications 116 may enable network-based system 110 to provide client 102 with additional services and/or information, such as data logging, data communications, security functions, targeted advertising, customer support, and/or other services, some of which will be discussed in greater detail below. Third-party servers 114 and/or third-party applications 116 may also provide system 110 and/or client 102 with other information and/or services, such as email services and/or information, property transfer and/or handling, purchase services and/or information, and/or other online services and/or information.

In one embodiment, third-party servers 114 may include an email server that hosts a user's email account. In some embodiments, the third-party servers may include advertisement selection server for providing advertisements. In yet another embodiment, third-party severs 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account management, parameter management, parameter monitoring, parameter execution, monetary transfers, device management, device monitoring, data gathering, data analysis, and other services to users that access network-based system 110. In various embodiments, client devices 104 and/or third-party servers 114 may communicate with applications servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various user device monitoring, advertisement management, data gathering, and discount management services. Application server 130 of network-based system 110 may provide services such as, account services, authentication services, product management services, payment services, user data gathering services, location services, data analysis services, notification services, fund transfer, funds and/or currency exchanges, and/or other services. Application servers 130 may include an account server 132, a device monitoring server 138, a task incentive management server 140, an advertisement server 142, a notification server 144, and/or a message server 146. Application servers 130 may further include a device identification server 134, a tap prediction server 136, and/or a messaging server 146. These servers, which may be in addition to other servers, may be structured and arranged to monitor user devices and predict user hesitancy on a touch screen device in addition to some or all of the other services as discussed above and in more detail below.

Application servers 130, in turn, may be coupled to and capable of accessing one or more databases 150 including an incentive database 152, a user account database 154, and/or training database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
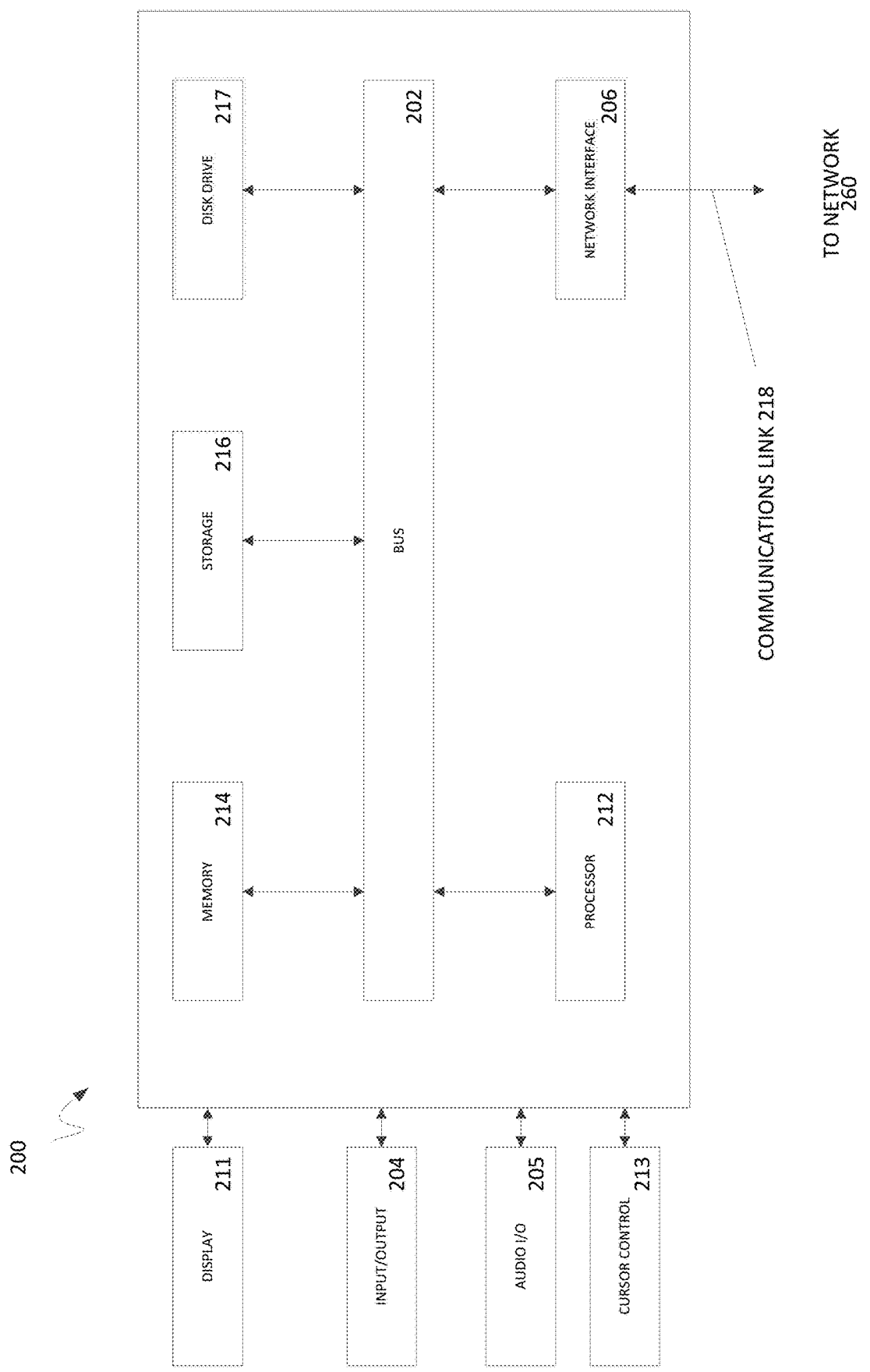
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
FIG. 3 is a flow diagram illustrating an exemplary process of a system providing incentives based on non-touch bases user interactions with a touchscreen.

FIG. 3 illustrates an exemplary process 300 that may be implemented by a system to detect hesitancy to tap a touch screen device. Process 300 may be implemented on a system such as system 100 of FIG. 1 according to some embodiments. According to some embodiments, process 300 may include one or more of operations 301-306 which may be implemented, at least in part, in the form of executable code stored on a non-transitory, tangible, machine readable media that, when run on one or more processors, may cause a system to perform one or more of the operations 301-306.

At operation 301, the system may receive sensor information from a user device for detecting whether an object is about to tap on a touchscreen of the user device. The manner in which the sensor data is analyzed may depend on the type of sensor data that the system receives.

In some examples, the sensor data may be from one or more proximity sensors, such as a capacitive sensor, photoelectric sensor, and/or the like. The proximity sensor may be configured to sense objects that are within a threshold distance of a touchscreen of the device. For example the proximity sensor may be configured to detect object within a threshold distance, such as 5 mm. In some examples, the proximity sensor may be an attachment to the user device that communicatively couples with the system. In some examples, the sensor may communicatively couple with the system through the user device.

In some examples, the sensor data may be from one or more image sensors, such as one or more of semiconductor charge-coupled devices (CCD), active pixel sensors of a metal-oxide-semiconductor (CMOS), active pixel sensors of a N-type metal-oxide-semiconductor (NMOS), and/or the like. When sensor data of an image sensor is received, the data may be in the form of one or more arrays and/or matrices. The cells of the arrays and/or matrices may represent a color and/or intensity for a pixel of an image.

In some examples, the sensor data may be a heat map sensed by the device. For example, the front of a user device may have one or more heat sensors. In some examples a plurality of heat sensors forming a matrix on the user device may monitor heat intensities. The heat sensor data may also be provided in the form of a matrix, the cells of the matrix having values indicating heat intensity on certain locations of the heat sensor. In some examples, the heat intensities sensed on the heat sensor may correspond to a location of a touch screen of the user device.

In some examples, the sensor data may be from an infrared sensor, thermographic camera, and/or infrared camera. The sensor information may be data provided in an array and/or matrices. The cells of the arrays and/or matrices may represent a color and/or intensity for a pixel of a thermographic image. The different colors of the pixels and/or intensity may represent and/or correspond to a heat value of a heat color map. The system may be able to determine a heat value based on the color and intensity of each pixel. In some examples, the sensor may be an accessory or peripheral device that connects to the user device and provides the sensor information. For example, the sensor may be a camera attachment, a case, screen protector, and/or the like.

In some examples, the system may combine information from multiple sensors to create a combined sensor reading image and/or data file. For example, an infrared camera sensor may provide thermal imaging data which may be combined with imaging data from a CMOS sensor. In this manner, the image from the CMOS sensor may provide an outline or context to the objects that are providing the heat readings to the infrared camera. In some examples, the system may create an outline of image data from the CMOS sensor using various edge detection algorithms and superimpose that image with the heat image. In this manner, the outlines may delineate different objects that are producing each heat response.

In some examples, the sensor data may include identifiers that indicate the type of data being received and/or data format of the sensor data. In this manner, the system may be able to differentiate different sensor data for analysis and/or determine which data types to combine before analysis.

In instances where there are multiple sensor and/or power hungry sensors, it may be useful to have one or more energy saving techniques on the user device to increase battery life. Having all of these sensors turned on in a constant monitoring mode may be an inefficient use of energy. As such, in some examples, one or more of the energy saving techniques may be implemented on the user device such that the energy used by the sensors may be reduced. In some examples, the energy saving system and sensor monitoring system may be one or more applications on a user device that communicates and couples with the system. In some examples, to reduce energy consumption, the sensors on the user device may remain off until a certain condition is met. Some exemplary conditions may include instances when the device unlocks a lock screen, the device is using a particular application, the device is using a web browser, the device is displaying a certain particular advertisement, the display of the device is turned on, and/or the like.

In some examples, the device may turn on a sensor or monitor a fraction of the pixels on a sensor until a condition occurs rather than having the entire sensor turned on. In response to the condition occurring, the system may then turn on all of the pixels of the sensor. In some examples, when there are multiple sensors, one or more of the sensors may be turned off until a condition occurs on one or more other sensors.

Some exemplary sensor based conditions may include a sensor reading of heat above a certain threshold value or between two thresholds. In some examples, the condition may be when a heat sensor reads a large heat difference between readings or threshold period of time. In some examples, the condition may be a heat reading pattern where there is a sharp difference and/or threshold difference in heat readings between pixels. In some examples, the condition may be when a heat reading pattern and/or signature is conical or cylindrical in shape, which may be based on the heat pattern a finger and hand may create. In some examples, the condition may be a sharp light intensity change on a portion of the pixels.

At operation 302, the system may receive information about the device, device usage information, device status information, and/or the like. In some examples, the system may receive information about the device, such as a device identifier. Some examples of device identifiers include, but are not limited to, unique device identifier (UDID), Android ID, international mobile equipment identity (IMEI), international mobile subscriber identity (IMSI), an assigned mobile number, and/or the like. The system may use the device identifier for categorizing, storing, cataloging, recording, identifying, associating, and/or retrieving data associated with the device.

The system may also receive device status information. Device status information may include internet activity, application activity, and/or the like. In some examples, device status information may include information such as what advertisements have been displayed, what is being displayed on the user device, what has been displayed within a predetermined amount of time on the user device, website browsing history, product purchases that were made through an application, how long a product was browsed on an application, what products were displayed on the device, what products are currently displayed on the device, if there is a product in a checkout portion of an application or website, and/or the like.

In some examples, the system may log and record the received data in a folder or in a data partition associated with the device identifier or an account associated with the device identifier.

In some examples, the system may also receive other information, such as readings from a global position system (GPS), time of day, weather, applications that are installed on the device, user accounts associated with the device, demographic information (e.g., age, weight, fitness level, height, and/or the like).

At operation 303, the system may determine from the data received at operation 302 what products, services, and/or advertisements are being browsed or on display of the user device. For example, a user may be at a product purchase page for a product or a product may be currently advertised in a side bar of a webpage. In some examples, the system may determine that the user device is at a checkout page right before the purchase of a product. The system may also check in the database for whether the product being displayed had been displayed on the device at a previous time, and if so, for how long. The system may also determine how long the product has been on display on the user device.

In some examples, the products may be determined from metadata of an image of the product or provided by the application used to view the product. In some examples, advertisements, product pages, checkout pages, and/or applications may provide identifying information about the product. Some exemplary identifiers may be the name of the product, a universal product identifier, stock keeping unit SKU, and/or another identifier for the product.

At operation 304, the system may determine whether an object such as a finger, hand, stylus, or other object is in close proximity to a touchscreen of the user device. This may be an attempt to identify that a user is about to purchase a product but is displaying some hesitancy. In some examples, close proximity may be detectable distance of a sensor, such as a detection range of a proximity sensor. In some examples, the system may simply determine, based on sensor information received at operation 301, whether an object, such as a finger, is detected by the sensor. In some example, the system may determine whether an object is within close proximity based on whether the sensor information indicates that the object can be detected within a predetermined resolution. For example, the system may determine the object is within close proximity when a certain number of pixels of an image sensor detect the object. In some examples, the system may receive image information, and the system may determine whether the object encompasses a threshold percentage and/or number of the image pixels. In some examples, the system may use a training database to predict whether and object is in close proximity to a screen as discussed in more detail below.

In some examples, the system may also determine how long the object has stayed continuously in close proximity to the screen, similar to someone who may be hesitant to complete and action. In some examples, the system may continue to receive sensor information at operation 301 and continue to determine that an object is close to the screen in operation 304. The system may monitor the sensor information continuously being received at operation 301 until the system determine that there is not and object close to the screen. The system may then determine the time difference in time stamps from when the system first detected the time stamp to when the system no longer detected the object.

At operation 305, the system may determine whether any incentives are available for the product determined at process 303. The system may search a database of incentives to see if one matches the product identifier determined at operation 303. In some examples, the incentives may be associated with one or more rules or conditions for providing the incentive. In some examples, the rules may be provided and/or set by a merchant through a third-party device. For example, a rule may be limited to a geographic location. In such an example, the system may use the location information received at operation 302 to determine whether the device is within the geographic location and qualifies for the incentive. Other possible rules and/or conditions may be based on demographic information (such as age, gender, and/or other demographic information), a set limit on the number of incentives provided for the product, a limit on the number of incentives for a device or an account, number of full priced items purchased with a device or an account, number of purchases made from one or more brands and/or merchants using a device or account, whether a purchase was made from a brand or merchant within a predetermined time, how long the object was detected at operation 304, and/or the like.

Some exemplary incentives may be a monetary discount on the product or service, an additional free product and/or service, a discount on a related product and/or service, free warranty, and/or the like.

In some embodiments, the system may use the information received to aid in advertisement targeting. As discussed in operation 304, the system may determine that an object was close to a touch screen while a product was on display. The system may determine that an object was close to the screen for a prolonged period of time when a product was on display. The system may determine that this is an indicator that the user is interested in the product. For example, the system may determine from the above discussed time stamps that an object was in close proximity with the touch screen for more than a threshold period of time, such as 5 seconds. However, the user may not have made the purchase and decided to move on or purchase something else. The system may record this information and provide it to an advertisement placement server for helping the server decide which advertisements to place. The advertisement server may be configured to choose a rotation of advertisements to a user based on browsing history, but to display advertisements more frequently when it receives an indication from the system that the user showed interest in a particular product.

When the system determines that an incentive is available for the product and the rules and conditions for all the invectives are met, the system may offer the incentive at operation 306. In some examples, the manner in which the incentive is provided may be determined by a third party. A third party, through a third-party device, may indicate that the offer be provided through a message, such as short messaging service, email, instant message, and/or the like. There may be several different manners in which the incentives are provided. For example, a pop-up window with a coupon may be displayed. In some examples, the price on the page may be slashed directly on the page without a pop-up window. The page may provide a message such as "please accept this discount as a loyal customer." Other examples of incentives may include the addition of a free product, fee shipping, free upgraded shipping, free upgrades, and/or the like.

In some examples, to orchestrate providing the incentive, the system may be in communication with another server or system that is handling the display of the product. For example, the user may be communicating with a content host system, such as a merchant system or merchant server hosting the website or content that the user is viewing. The system may then indicate to the content host system to reduce prices and/or provide another incentive on one or more products being sold to the user. For example, the system may provide the device identifier and product identifier that the user is viewing to the content host system, and the content host system may, in response, reduce the price and/or provide another incentive for the product identified by the product identifier when being viewed by a device with the device identifier.

In some examples, the system may contact the product seller for authorization to provide the incentive. In some examples, the system may provide the product seller contact information such that the seller can directly contact the user of the user device to provide an incentive.

Figure 4:
FIG. 4 is a flow diagram illustrating an exemplary system for identifying non-touch based touchscreen interactions.

FIG. 4 illustrates an exemplary process 400 that may be implemented by a tap prediction system. Process 400 may be implemented on a system such as system 100 of FIG. 1 according to some embodiments. According to some embodiments, process 400 may include one or more of operations 401-406 which may be implemented, at least in part, in the form of executable code stored on a non-transitory, tangible, machine readable media that, when run on one or more processors, may cause a system to perform one or more of the operations 401-406.

At operation 401, the system may receive sensor information from one or more user devices for creating a training base. The system may update and use the training database for predicting whether an object is close to and/or about to tap a touchscreen of the user device. In some examples, the sensor information may be from one or more sensors on the user device similar to the sensors discussed in operation 301 of FIG. 3.

In some examples, the system may maintain multiple different training databases based on one or more factors. For example, the system may create a different training database for different device categories and/or models. Different device models and categories may have different placements of sensors and different types of sensors such that the data received from one device may not be a good training data point for another device. Furthermore, in some examples, the sensor information may come from an attachment or an adapter, and as such, a different database may be created based on adapter information.

In some examples, the system may create a different training database for each device unique identifier. User mannerisms, hand sizes, finger sizes, and tapping techniques may differ from individual to individual. As such, having an individualized training database for each device identifier may allow the system to make more accurate in detecting objects because user devices are usually used by a single owner.

At operation 402, the system may receive an indication from the user device that the touchscreen received an input, such as a finger or other object touching the touchscreen. In order for the system to accurately predict whether an object is within tapping range of the touchscreen, the system may create a training database with confirmed taps. Because an object tapping the touchscreen also has to come close to the touchscreen before the tap occurs, the system can use the sensor information received just before a tap occurred as training data to predict future taps and/or whether an object is within tapping range of the touchscreen. In this manner, the system may use the tap indication received at operation 402 as a trigger to record the sensor information just before the tap occurred as a verified data point of an object being within tap or close proximity of the touchscreen.

At operation 403, the system, in response to receiving the tap indication at operation 402, may record the sensor information received at operation 401 just before the receipt of the tap indication at operation 402. In some examples, the system may receive device sensor information at short and regular intervals from the user device at operation 401, and the system may maintain a buffer and/or cash of the sensor information. In some examples, the intervals may be at a predetermined periodicity. In some examples, the intervals may depend on the device. In some examples, the intervals may be based on time and/or clock cycles.

In some examples, the system may maintain a buffer of sensor readings. The buffer may be a predetermined amount. The amount may be based on a memory size, number of readings, and/or time interval. In some examples, the system may transfer the buffered sensor readings into the training database. In some examples, the system may take a subset of the buffered sensor readings into the training database. For example, the system may record one or more sensor readings that occurred just before the tap indication. In some examples, the system may receive timestamp information along with the sensor readings and the tap indication, and the system may use the time stamp information to determine which sensor readings to record. In some examples, the system may record sensor readings that have time stamps within a predetermined interval at a predetermined amount of time before the time stamp of the tap indication.

The sensor information may be held in a training database such that the system can predict whether a tap is about to occur or whether there is an object in a position to tap the touchscreen of the user device.

In some examples, the system may also record some sensor data in the training database that did not result in a tap indication within a predetermined amount of time. In this manner, the system may have two classes of data in the training database, one class with a positive tap indication and another without.

At operation 404, the system may receive sensor data from one or more user devices, much like the data received at operation 401. However, the sensor data received at operation 404 may be from a different application or may be received from another application interface with the system such that the system is requested to categorize the sensor information or determine whether and object is in close proximity with the touchscreen. In some examples, the sensor data may be received with a specific request.

At operation 405, the sensor data may predict whether an object is in close proximity with the touch screen by classifying the sensor data received at operation 404 using the training database at operation 403. The classification may be a binary prediction of whether the sensor data predicts an object in close proximity with the touch screen or not. In some examples, the system may calculate a mean for the training database. The system may determine that received sensor data located at a predetermined number of standard deviations away from the mean as not having an object near the touchscreen. Additionally, the system may positively predict that an object is close to the touch screen when the sensor data is located within the predetermine number of standard deviations of the mean.

In some examples, the system may use one or more supervised learning algorithms with the training database to predict whether an object is within tap proximity or close to the touchscreen of the device. Some exemplary supervised learning algorithms may include decision trees, linear regression, Naïve Bayesian classifier, neural networks, and/or the like.

At operation 406, the classification may be used to predict whether an object is in close proximity to the device or in a position to tap the touchscreen based on how the data received at operation 404 is classifies using the training database.

Figure 5:
FIG. 5 is an exemplary incentive optimization process.

FIG. 5 illustrates an exemplary process 500 that may be implemented to optimize incentives. Process 500 may be implemented on a system such as system 100 of FIG. 1 according to some embodiments. According to some embodiments, process 500 may include one or more of operations 501-505 which may be implemented, at least in part, in the form of executable code stored on a non-transitory, tangible, machine readable media that, when run on one or more processors, may cause a system to perform one or more of the operations 501-505. In some examples, process 500 may be implemented as part of operation 306 of FIG. 3.

At operation 501, the system may receive a request to provide an optimized incentive for a product and/or service. The request may be received with certain data associated with the user, user device, and/or account that would be receiving the incentive. For example, the system may receive geographical information; number of times the user, user device, and/or account viewed the product and/or service; how long the user, user device, and/or account has been viewing the product and/or service; demographic information about the user; time of day; purchase history of the user and/or account; the type of device that is going to receive the incentive; sensor information, such as the sensor information discussed in FIG. 3; and/or the like. In some examples, the system may receive facial images of the user or analysis of a facial image associated with the user indicating an emotion.

At operation 502, the system may use the information received at operation 501 to determine an optimal discount that will result in a purchase. In some examples, the system may use a neural network to predict the optimal discount. For example, the inputs for the neural network may be from one or more of the sensor information and a discount amount. In some examples, the sensor information may be normalized and/or sampled before being used as inputs into the neural network. The neural network may be configured to provide a binary response predicting whether the inputs will result in a purchase.

In some examples, the system may iteratively increase the discount of the product and/or service as the input into the neural network until a response from the neural network predicts that a purchase will result. The system may also initiate the discount based on previous discounts, such as an average discount value that resulted in a purchase, or based on a predetermined discount value. The system may also have a predetermined threshold max discount that can be provided. In some examples, a merchant provider may provide the max discount. In this manner, a merchant provider can ensure that the products and/or services are not sold at a loss.

In some examples, the system may be also configured to predict whether other incentives would be successful in causing a purchase. For example, bundling a related item for free or at a discount. The system may assign a value to the non-monetary incentive such that the same neural network may be used. In some examples, the value of the free product may be used to predict whether a purchase is made. In some examples, the system may devalue the product by a certain amount, as individuals usually would value monetary discounts higher than a bundled item.

In some examples, the monetary discounts may be compared with bundled item discounts to figure out how much more or less the bundled item is valued compared to a monetary incentive. For example, the system, after having provided several incentives, may determine that a bundled item on average is 20% higher in value than a monetary incentive to achieve similar successful purchases numbers. The system may then discount the value of a bundled item by 20% when used as an input for predicting whether the incentive will be successful in causing a purchase.

At operation 503, the system may provide the incentive. The incentive may be the optimized discount that resulted in a predicted purchase at operation 502. In some examples, the incentive may be the maximum discount, such as when the system reaches the maximum discount before finding a discount value that resulted in a predicted purchase at operation 502.

At operation 504, the system may verify whether a purchase occurred. In some examples, the discounts may have a time limit, such that the system may be able to verify whether the prediction was correct or not. When the time limit has passed without the system receiving a verification of the purchase, the system can classify this prediction as incorrect. In contrast, the system may receive an indication that a purchase was made using the provided discount, and classify such a prediction as correct.

In some examples, the verification of the discounted purchase may be received from a merchant system or another server that handles the purchase of the product and/or services. In some examples, the verification may be received from the user device.

In some examples, the system may also receive information on how long it took a user to accept an incentive. For example, a system may receive an indication, such as a time stamp, as to when the inventive was provided and when the product was purchased. The system may then determine based on the time difference how successful the incentive was, and adjust accordingly. For example, the incentive may have a time limit, and the close the purchase was made at the beginning of the time limit, the system may determine that the incentive was too big. On the other hand, if the purchase was made around the middle or end of the time limit, the system may determine that the incentive was optimized well.

At operation 505, if the system prediction was incorrect, the system may update the neural network to make better predictions in the future. Similarly, if the system determines that the incentive was too big, the system may again update the neural network to make a better prediction in the future. For example, the system may use some form of gradient decent and/or back propagation on the neural network to train the neural network and update weight values.

Figure 6:
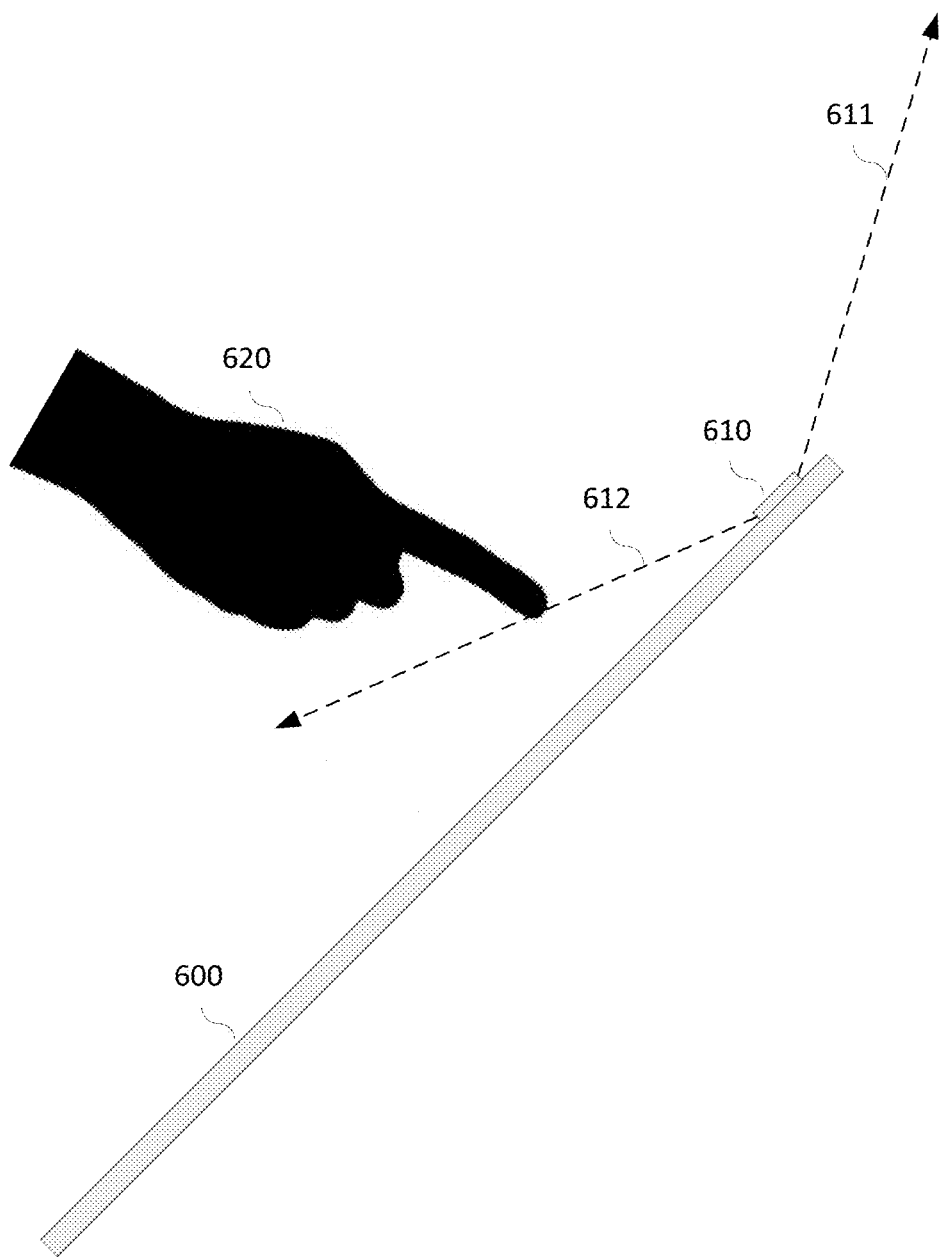
FIG. 6 is an exemplary user device capable of identifying non-touch based user interactions with a touchscreen.

FIG. 6 is an exemplary user device 600 that may be configured to provide sensor information to one or more of the systems and/or processes described above in FIGS. 3-5. Device 600 may be used as one or more of the client devices 104 of FIG. 1. In some examples, device 600 may be a computer system as described in FIG. 2. Device 600 may be a device that is in communication with the systems and/or processes described in FIGS. 3-5 and provide sensor data and device information to such systems.

Device 600 may include one or more sensors, such as an image sensor 610, for sensing an object 620 in front of device 600. In some examples, image sensor 610 may include a wide angle lens. The wide angle lens may allow for the image sensor to have a wide field of view as indicated by the field of view lines 611 and 612. In this manner, image sensor 610 may be able to detect object 620 even when close to device 600 but at the edge of the field of view.

In some examples, sensor 610 may be one of several sensors (not shown) that are used for detecting object 620. Device 600 may have a wireless communication interface which may be used to communicate the sensor data to one or more systems described above.

Figure 7:
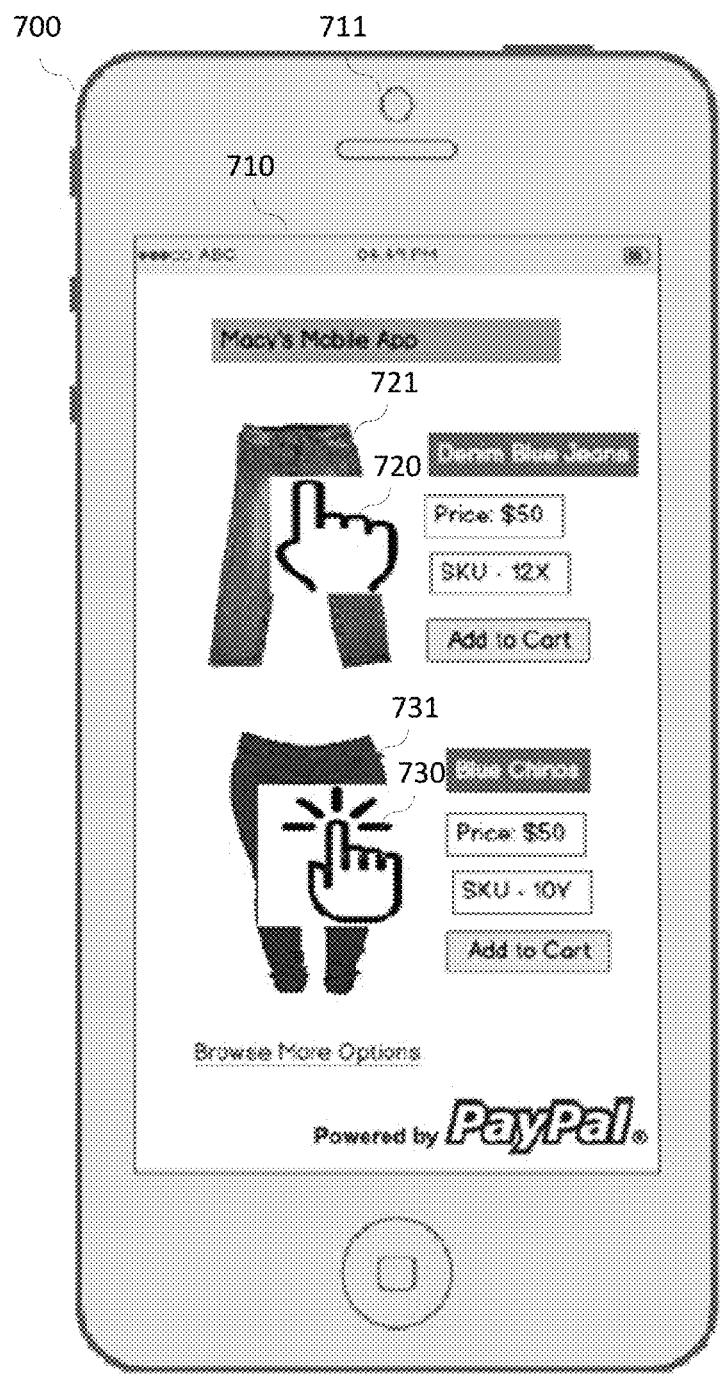
FIG. 7 depicts a sample tap proximity situation that one or more systems may handle.

FIG. 7 depicts a sample tap proximity situation that one or more systems discussed above may handle. As shown in FIG. 7, a user may be browsing a purchase page of an application and/or website on user device 700 through touchscreen 710. The user may be interested in purchasing one or more products being displayed on touchscreen 710, such as product 721 and/or 731.

As the user is deciding whether to purchase product 721 and/or 731, the user may hover or bring a finger 720 over and/or close to touchscreen 710 in an area displaying product 721. User device 700 may have a sensor 711 that may be monitoring and sensing information regarding objects near user device 700. Sensor 711 may be an image capturing sensor and/or a proximity sensor. Finger 720 may come cross a threshold distance that causes sensor 711 to sense Finger 720. User device 700 may send the sensor information to a system, such as the system in FIG. 3, where the sensor information is received at operation 301. The system may, based on the sensor information received, determine that Finger 720 crossed a threshold distance close to the touchscreen 710 and/or determine that Finger 720 has characteristics indicating that Finger 720 is about to tap touchscreen 710. This sensor information may allow the system described in FIG. 3 and/or FIG. 4 to determine that the user had almost tapped or brought an object near touchscreen 710 where product 721 is displayed, as discussed in processes 303-304 of FIG. 3.

The user, however, may make a tap 730 on touch screen 710 for product 731 instead of product 721. As such, the system may determine that the user was interested in product 721 from the received sensor information, but did not make a purchase of that product. This information may be determined as discussed above in FIG. 3 processes 303-304.

The system, having determined that the user was interested in product 721, may determine one or more actions to conduct. For example, the system may provide a targeted advertisement and/or incentive to the user as discussed in operations 303-306 of FIG. 3.

In some examples, the system may determine what incentive would be optimized to cause the user to purchase product 721. For example, the system may use one or more operations of FIG. 5 discussed above for determining an incentive.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to cause the system to perform operations comprising:
        determining that content comprising a selectable user interface element associated with an item is displayed on a particular portion of a touchscreen of a user device associated with a user;
        detecting, based on sensor information obtained from the user device, that an object usable to make a selection on the touchscreen is within a threshold distance from but not contacting the particular portion of the touchscreen;
        monitoring a movement of the object with respect to the particular portion of the touchscreen;
        determining, based on the monitoring, that the object has moved away from the particular portion of the touchscreen after being within the threshold distance from the particular portion of the touchscreen for a length of time exceeding a time threshold;
        in response to determining that the object has moved away from the particular portion of the touchscreen after being within the threshold distance from the particular portion of the touchscreen for the length of time, modifying the content based at least in part on the length of time; and
        causing the user device to display the modified content without the object contacting the touchscreen to trigger the selection of the item.

2. The system of claim 1, wherein the sensor information comprises images captured by a camera of the user device.

3. The system of claim 1, wherein the modified content comprises an incentive associated with the item.

4. The system of claim 3, wherein the operations further comprise determining an amount for the incentive based on the length of time.

5. The system of claim 3, wherein the operations further comprise adjusting the incentive based on a number of times the item was displayed on the user device.

6. The system of claim 3, wherein the incentive is determined further based on a determined geo-location of the user device.

7. A method comprising:
    determining, by one or more hardware processors, that an actuatable element is displayed on a particular portion of a touchscreen of a user device associated with a user;
    detecting, by the one or more hardware processors, that an object usable to make a selection on the touchscreen is within a threshold distance from but not contacting the particular portion of the touchscreen based on sensor information obtained from the user device;
    monitoring, by the one or more hardware processors, a movement of the object with respect to the particular portion of the touchscreen;
    determining, by the one or more hardware processors based on the monitoring, that the object has moved away from the particular portion of the screen after being within the threshold distance from the particular portion of the touchscreen for a length of time exceeding a time threshold;
    determining, by the one or more hardware processors, an interest level of the user toward actuating the actuatable element based at least in part on the determined length of time;
    in response to determining that the object has moved away from the particular portion of the touchscreen after being within the threshold distance from the particular portion of the touchscreen for the length of time, determining, by the one or more hardware processors, content for providing to the user based at least in part on the determined interest level; and
    causing, by the one or more hardware processors, the user device to present the content without the object contacting the touchscreen to actuate the actuatable element.

8. The method of claim 7, wherein the content comprises an incentive to the user for actuating the actuatable element.

9. The method of claim 8, wherein the incentive is determined further based on data displayed on the touchscreen of the user device.

10. The method of claim 7, wherein the actuatable element is associated with purchasing a product from a website, and wherein the method further comprises transmitting the determined interest level to the website.

11. The method of claim 7, further comprising activating a camera of the user device in response to determining that the actuatable element is displayed on the touchscreen of the user device.

12. The method of claim 7, wherein the actuatable element is part of a checkout page of a merchant website.

13. The method of claim 8, further comprising calculating a price point for the incentive based at least in part on the determined interest level.

14. The method of claim 13, wherein the price point is determined further based on a current price point for a product displayed on the user device.

15. A non-transitory machine readable medium having stored thereon machine readable instructions executable to cause a machine to perform operations comprising:

determining that a selectable user interface element associated with a product is displayed on a particular portion of a touchscreen of a device associated with a user;

detecting, based on sensor information obtained from the device, that an object usable to make a selection on the touchscreen is within a threshold distance from but not contacting the particular portion of the touchscreen;

monitoring a movement of the object with respect to the particular portion of the touchscreen;

determining, based on the monitoring, that the object has moved away from the particular portion of the touchscreen after being within the threshold distance from the particular portion of the touchscreen for a length of time exceeding a time threshold;

in response to determining that the object has moved away from the particular portion of the touchscreen after being within the threshold distance from the particular portion of the touchscreen for the length of time, determining a discount for purchasing the product via the device based at least on the determined length of time; and causing the device to display the discount without the object contacting the touchscreen to trigger the selection of the item.

16. The non-transitory machine readable medium of claim 15, wherein the operations further comprise:

determining that the user has completed a purchase transaction with the discount via the device; and adjusting a future discount based at least in part on the determining that the user has completed the purchase transaction.

17. The non-transitory machine readable medium of claim 15, wherein the operations further comprise:

determining that the user has not completed a purchase transaction with the discount via the device within a predetermined amount of time from causing the device to display the discount; and determining a future discount based at least in part on the determining that the user did not complete the purchase transaction within the predetermined amount of time.

18. The non-transitory machine readable medium of claim 15, wherein determining the discount comprises:

determining a number of times the product is presented for the user.

19. The non-transitory machine readable medium of claim 15, wherein the discount is determined further based on a geographic location of the device.

20. The system of claim 1, wherein the operations further comprise:

determining, based on the sensor information, a distance between the object and the particular portion of the touchscreen, wherein the content is modified further based on the determined distance.

* * * * *